(12) United States Patent
Ekambaram et al.

(10) Patent No.: US 8,484,453 B2
(45) Date of Patent: Jul. 9, 2013

(54) DATA PROCESSING SYSTEM HAVING AN OPERATING SYSTEM ADAPTER AND METHOD

(75) Inventors: Natarajan Ekambaram, Austin, TX (US); Jaroslav Cernoch, Brno (CZ); Gregory A. Hemstreet, Austin, TX (US); Marek Vinkler, Brno (CZ)

(73) Assignee: Freescale Semiconductor, Inc., Austin, TX (US)

(*) Notice: Subject to any disclaimer, the term of this patent is extended or adjusted under 35 U.S.C. 154(b) by 472 days.

(21) Appl. No.: 12/787,262

(22) Filed: May 25, 2010

(65) Prior Publication Data

US 2011/0296150 A1 Dec. 1, 2011

(51) Int. Cl.
*G06F 15/177* (2006.01)

(52) U.S. Cl.
USPC ........ 713/100; 713/1; 713/2; 710/10; 710/62; 710/104; 719/321; 719/327

(58) Field of Classification Search
USPC ....... 713/1, 2, 100; 710/10, 62, 104; 719/321, 719/327
See application file for complete search history.

(56) References Cited

U.S. PATENT DOCUMENTS

| | | | | |
|---|---|---|---|---|
| 5,265,252 A | * | 11/1993 | Rawson et al. | 719/326 |
| 6,226,665 B1 | * | 5/2001 | Deo et al. | 718/106 |
| 6,321,279 B1 | * | 11/2001 | Bonola | 710/36 |
| 6,606,669 B1 | * | 8/2003 | Nakagiri | 719/327 |
| 7,448,022 B1 | | 11/2008 | Ram et al. | |
| 2004/0226025 A1 | * | 11/2004 | Beaudoin et al. | 719/321 |
| 2007/0033659 A1 | | 2/2007 | Hoche et al. | |

FOREIGN PATENT DOCUMENTS

EP 1670212 B1 10/2007

OTHER PUBLICATIONS

Katayama et al.; "Proposal of a Support System for Device Driver Generation"; 1999; pp. 494-497; IEEE.
Katayama et al.; "A Method for Automatic Generation of Device Drivers with a Formal Specification Language"; IWPSE98; pp. 183-187.

* cited by examiner

*Primary Examiner* — Thuan Du
(74) *Attorney, Agent, or Firm* — Joanna G. Chiu

(57) ABSTRACT

A data processing system includes a central processing unit (CPU) and a memory coupled to the CPU. The memory includes an operating system (OS) adapter component, which comprises information specific to a particular operating system; an OS-independent processor component, which, when executed by the CPU, generates initialization code for a target processor using information from the OS adapter component, wherein the initialization code is specific to the particular operating system; and an OS-independent peripheral component, which, when executed by the CPU, generates driver code using information from the OS adapter component, wherein the driver code is specific to the particular operating system and the target processor.

20 Claims, 2 Drawing Sheets

DATA PROCESSING SYSTEM HAVING AN OPERATING SYSTEM ADAPTER AND METHOD

BACKGROUND

1. Field

This disclosure relates generally to data processing systems and more specifically to a data processing system having an operating system adapter and related methods.

2. Related Art

Increasingly, to be commercially viable processors must be supported by different operating systems. For example, the same processor must work with Windows CE, Linux, MQX, Symbian, or other operating systems. Additionally, increasingly, the processors must interface with a large number of peripherals, such as USB devices, Ethernet, printers, displays, and storage devices. As part of this process, device drivers and related code for the various peripherals must be generated for each of the variety of peripherals and operating systems. Many processors cannot be supported by these operating systems due to the high costs associated with generating the device drivers and related code for the myriad of operating systems and peripherals.

Traditional solutions to this problem have been piecemeal. For example, some solutions rely on the existence of a common programming interface. The lack of common programming interfaces severely restricts the applicability of these solutions.

Accordingly, there is a need for a data processing system having an operating system adapter and related methods.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
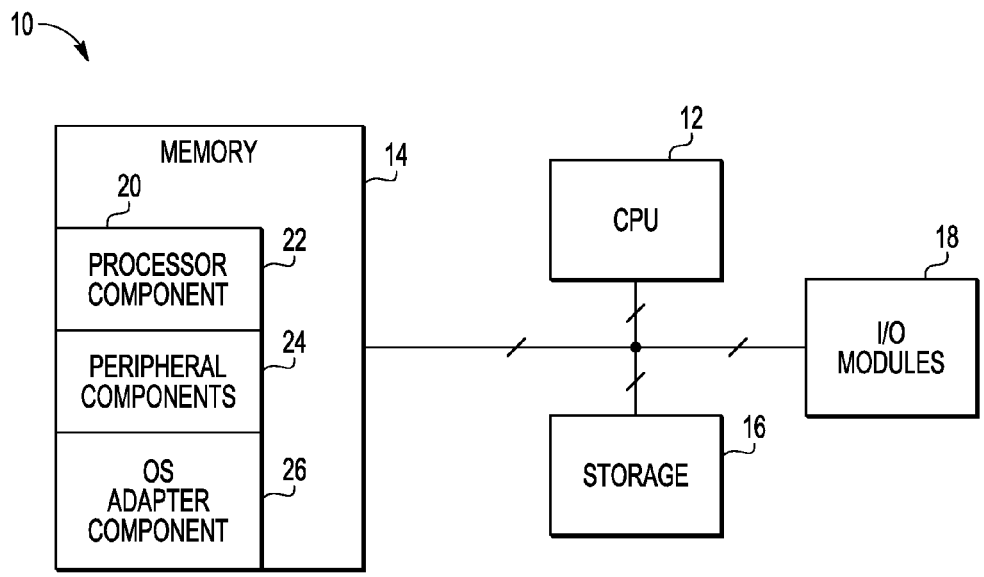
FIG. 1 is a block diagram of an exemplary data processing system having an operating system adapter.

In one aspect, a data processing system, including a central processing unit (CPU) and a memory coupled to the central processing unit. The memory may include an operating system (OS) adapter component that includes information specific to a particular operating system. The memory may further include an OS-independent processor component, which, when executed by the CPU, generates initialization code for a target processor using information from the OS adapter component, wherein the initialization code is specific to the particular operating system. The memory may further include an OS-independent peripheral component, which, when executed by the CPU, generates driver code using information from the OS adapter component, wherein the driver code is specific to the particular operating system and the target processor.

In another aspect, in a data processing system comprising an operating system (OS) adapter component which is specific to a particular operating system, an OS-independent processor component, and an OS-independent peripheral component, a method is provided. The method may include generating OS-specific initialization code for a target processor by the OS-independent processor component, wherein during the generating the OS-specific initialization code, the OS-independent processor component queries the OS adapter for information specific to the particular operating system. The method may further include generating OS-specific driver code for the target processor by the OS-independent peripheral component, wherein during the generating the OS-specific driver code, the OS-independent peripheral component queries the OS adapter for information specific to the particular operating system, and wherein the OS-specific driver code is also specific to the target processor.

In yet another aspect, a data processing system, including a central processing unit (CPU) and a memory coupled to the central processing unit. The memory may include an operating system (OS) adapter component that includes information specific to a particular operating system. The memory may include an OS-independent processor component, which, when executed by the CPU: (1) provides a request to the OS adapter component for an interrupt service routine type, wherein, in response thereto, the OS adapter component provides the interrupt service routine type specific to the particular operating system to the OS-independent processor component; and (2) uses the received interrupt service routine type from the OS adapter component to generate initialization code for a target processor that is specific to the particular operating system. The memory may further include an OS-independent peripheral component, which, when executed by the CPU: (1) provides one or more requests to the OS adapter component for information specific to the particular operating system, wherein, in response to each of the one or more requests, the OS adapter component provides the information to the OS-independent peripheral component; and (2) uses the received information from the OS adapter component to generate driver code specific to the particular operating system and the target processor.

FIG. 1 is a block diagram of an exemplary data processing system 10 having an operating system adapter. Data processing 10 may include a CPU 12, a memory 14, a storage 16, and I/O modules 18. Although FIG. 1 shows a specific number of components arranged in a specific manner, additional or fewer components may be arranged differently. Memory 14 may further include a source generation module 20. Source generation module 20 when executed by CPU 12 may provide the functionality required for implementing at least some aspects of the functionality described herein. Memory 14 may include additional software, which when executed by CPU 12, may provide additional functionality. Source generation module 20 may include a processor component 22, peripheral components 24, and operating system (OS) adapter component 26. OS adapter component 26 may be used during design-time to change the structure and behavior of a device driver based on the specific operating system, thereby enabling a single device driver to support many different operating systems. As an example, processor component 22, when executed by CPU 12, may generate initialization code, such as bootstrap code. Initialization code may include functions that are specific to the particular operating system for which the initialization code is being generated. Processor component 22 may be operating system independent in that it need not be created for a particular operating system. Instead, the same processor component 22 may interact with peripheral components 24 and OS adapter component 26 to generate the initialization code for a specific target processor and a specific operating system. As an example, peripheral components 24, when executed by CPU 12, may generate target processor and operating system specific device driver code, initialization code, and installation code for a selected peripheral. Peripheral components 24 may correspond to the various peripheral devices, such as serial ports (UART), parallel ports, USB ports, Ethernet ports, or other peripheral devices. Each peripheral component may be operating system independent in that it need not be created for a particular operating system. Instead, the same peripheral component may interact with processor component 22 and OS adapter component 26 to generate target processor and OS specific driver code, initialization code, and installation code for the specific peripheral.

With continued reference to FIG. 1, OS adapter component 26 may include data models, algorithms, structural and behavioral guidelines for a specific device driver associated with a specific operating system. A collection of OS adapter components may be stored in storage 16. Processor component 22 and peripheral components 24 may query an OS adapter component 26 for OS dependent methods and guidelines for the specific device driver. This way, at design time, the structure and behavior of a device driver may be modified. OS adapter component 26 may include, or access, information, including: (1) synchronization methods/objects, (2) memory management methods/objects, (3) interrupt service models, (4) interrupt vectors, (5) device table structures, (6) device driver models, and (7) device entry points. As an example, synchronization methods/objects may include semaphores, events, and/or critical sections. As an example, memory management methods/objects may include memory objects, memory allocation scheme, and/or memory de-allocation scheme. As an example, interrupt service models may include information relating to the interrupt service model used for a particular operating system, such as interrupt service routines (ISRs) and deferred service routines (DSRs). As an example, interrupt vectors may be an index for an interrupt vector table. As an example, device table structure may include base address, control register, and buffers used by a particular device driver. As an example, device driver models may include static/dynamic, logical, and/or physical device driver models. As an example, device entry points may provide the driver model supported functions, such as read, write, and close.

Using memory allocation scheme, as an example, traditionally, the source code for a device driver for a UART may include the following:

```
DEVICE_DATA UART_Init(DEVICE_DATA *DeviceData)
{
#ifdef NON_RTOS
    /* Non-RTOS scenario, assign from global memory space */
    DeviceData = &Global_DeviceData;
#elif RTOS_1
/* RTOS_1 memory allocation*/
    DeviceData = (DeviceData *)malloc(sizeof(DeviceData));
#elif RTOS_2
    #ifdef CACHED_MEMORY
        DeviceData=(DeviceData*)
        mem_noncached_alloc(sizeof(DeviceData));
    #else
        DeviceData=(DeviceData*) mem_cached_alloc(sizeof(DeviceData));
    #endif
#elif RTOS_3
DeviceData=
(DeviceData*)RTOS3_mem_alloc((mem_block_size)sizeof(DeviceData));
#endif
...
```

-continued

```
...
...
setReg8(UCR0, 0x30);
setReg8(UCR0, 0x20);
    return (DeviceData);
}
```

Using the data processing systems and methods described herein, the source for the same device driver for the UART may be simplified to include only the following:

```
DEVICE_DATA UART_Init(DEVICE_DATA *DeviceData)
{
/* RTOS_1 memory allocation */
    DeviceData = (DeviceData *)malloc(sizeof(DeviceData));
...
...
...
setReg8(UCR0, 0x30);
setReg8(UCR0, 0x20);
    return (DeviceData);
}
```

Figure 2:
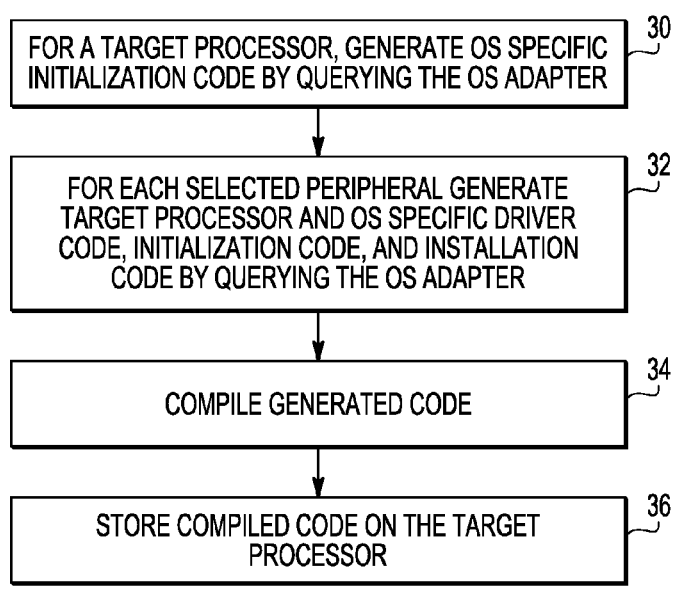
FIG. 2 is a flow chart for an exemplary method for generating code for a target processor using the data processing system of FIG. 1.

FIG. 2 is a flow chart for an exemplary method for generating code for a target processor using the data processing system of FIG. 1. As part of the method for generating code, in step 30, for a target processor, operating system specific initialization code may be generated by querying OS adapter 26. As an example, processor component 22 may perform this step, when executed by CPU 12. In step 32, for each selected peripheral, target processor and operating system specific driver code, initialization code, and installation code by querying OS adapter 26. In step 34, the generated code may be compiled. The compilation step may include compiling the generated code along with other source code. In step 36, the compiled code may be stored on the target processor. This way the target processor may perform various functions associated with the peripherals for the particular operating system that OS adapter 26 corresponds to. Although FIG. 2 shows a specific number of steps that are performed in a certain order, the exemplary method may include additional or fewer steps performed in a different order.

Figure 3:
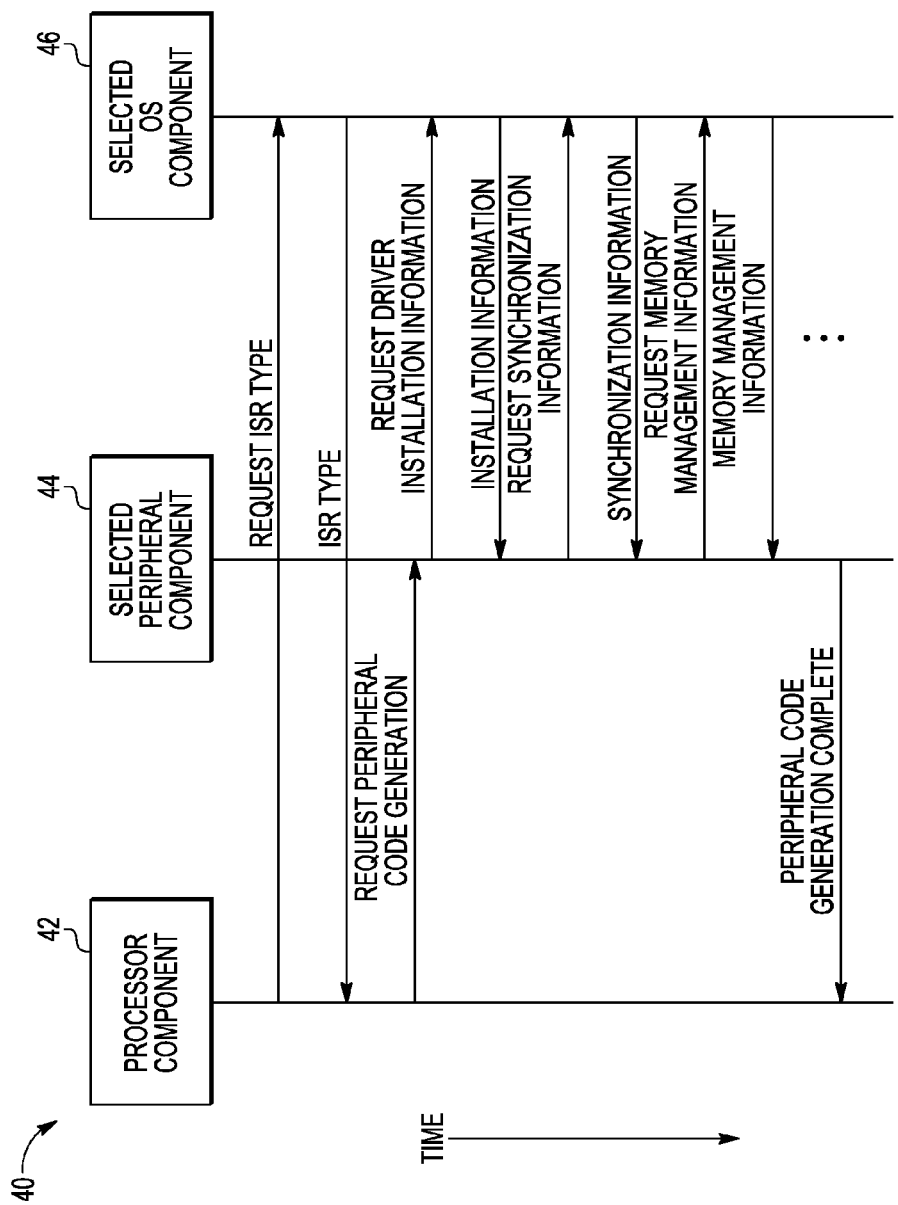
FIG. 3 is a diagram illustrating messages exchanged between certain components of the data processing system of FIG. 1.

FIG. 3 is a message exchange diagram 40 illustrating messages exchanged between certain components of the data processing system 10 of FIG. 1. By way of example, a processor component 42 (for example, shown as processor component 22 as part of memory 14) may exchange messages with a selected peripheral component 44 (for example, one of the peripheral component of peripheral components 24 shown as part of memory 14). Processor component 42 may also exchange messages with a selected OS adapter 46 (for example, shown as OS adapter component 26 as part of memory 26). Selected peripheral component 44 may exchange messages with processor component 42 and selected OS adapter 46. As an example, selected peripheral component 44 may exchange messages with selected OS adapter 46 for information that enables selected peripheral component 44 to generate code for the specific operating system. Similarly, as an example, processor component 42 may exchange messages with selected OS adapter 46 for information that enables processor component 42 to generate code for a target processor and the specific operating system.

As an example, processor component 42 may request interrupt service routine (ISR) type information from selected OS adapter 46. Selected OS adapter 46 may provide the requested information to processor component. As part of this process, processor component 42 may analyze, store and/or define the interrupt service model. Processor component may also predict an optimal interrupt model. For example, in an operating system where interrupts must be serviced faster, a deferred service routine (DSR) may be used instead of an immediate interrupt service routine. As part of predicting the optimal interrupt model, processor component 42 may analyze various types of information provided by OS adapter 46. Such information includes, but is not limited to, the number of peripheral drivers that may become active, the complexity of each driver, and the interrupt response times of the operating system at issue. Processor component 42 may request selected peripheral component 44 to generate peripheral code. The peripheral code may include target processor and operating system specific drive code, initialization code, and installation code. Selected peripheral component 44 may, in turn, request driver installation information from selected OS adapter 46. As an example, driver installation may include information, such as the name of the installation function, driver callback functions, and sets of function names, whose pointers may be passed to the installation function. Selected OS adapter 46 may provide installation information to selected peripheral component 44. Selected peripheral component 44 may use this information to generate code for the selected peripheral that is specific to a selected operating system and a selected target processor. As another example, selected peripheral component 44 may request synchronization information from selected OS adapter 46. Synchronization information may include semaphores, events, and/or critical sections related information. In response, selected OS adapter 46 may provide synchronization information to selected peripheral component 44. Selected peripheral component 44 may use this information to generate code for the selected peripheral that is specific to the selected operating system and the selected target processor. As another example, selected peripheral component 44 may request memory management information from selected OS adapter 46. Memory management information may include memory objects, memory allocation scheme, and/or memory de-allocation scheme. In response, selected OS adapter 46 may provide synchronization information to selected peripheral component 44. Selected peripheral component 44 may use this information to generate code for the selected peripheral that is specific to the selected operating system and the selected target processor. Once selected peripheral component 44 has all the information that it needs to generate the peripheral code that is specific to the selected operating system and the selected target processor, it may communicate a peripheral code generation complete message to processor component 42. Although not shown in FIG. 3, processor component 42 may exchange additional messages with selected peripheral component 44 and selected OS adapter 46. Similarly, although not shown in FIG. 3, selected peripheral component 44 may exchange additional messages with processor component 42 and selected OS adapter 46.

In one embodiment, the messages exchanged between processor component 42, peripheral component 44 and OS adapter 46 may require that the message scheme follow a specific order. As part of this example, processor component 42 and peripheral component 44 must query in the following sequence: (1) driver installation methods; (2) device driver table entry; (3) threading models for device drivers; (4) synchronization methods/objects; and (5) memory interface details.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between components are merely illustrative and that alternative embodiments may merge components or impose an alternate decomposition of functionality upon various components.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 14 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, and point-to-point telecommunication equipment, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system, comprising:
   a central processing unit (CPU); and
   a memory coupled to the central processing unit, wherein the memory comprises;
      an operating system (OS) adapter component, which comprises information specific to a particular operating system;
      an OS-independent processor component, which, when executed by the CPU, generates initialization code for a target processor using information from the OS adapter component, wherein the initialization code is specific to the particular operating system; and
      an OS-independent peripheral component, which, when executed by the CPU, generates driver code using information from the OS adapter component, wherein the driver code is specific to the particular operating system and the target processor.

2. The data processing system of claim 1, wherein the initialization code is specific to the particular operating system and the target processor.

3. The data processing system of claim 1, wherein the memory further comprises:
   a second OS-independent peripheral component, which, when executed by the CPU, generates second driver code using the information from the OS adapter component, wherein the second driver code is specific to the particular operating system and the target processor.

4. The data processing system of claim 1, wherein the initialization code that is specific to the particular operating system includes functions of the particular operating system.

5. The data processing system of claim 1, wherein the OS-independent peripheral component, when executed by the CPU, generates both peripheral initialization code and installation code using information from the OS adapter component, wherein each of the peripheral initialization code and the installation code is specific to the particular operating system and the target processor.

6. The data processing system of claim 1, wherein the information specific to the particular operating system in the OS adapter includes a device table structure specific to the particular operating system.

7. The data processing system of claim 1, wherein the information specific to the particular operating system in the OS adapter includes memory management information specific to the particular operating system.

8. The data processing system of claim 1, wherein the information specific to the particular operating system in the OS adapter includes at least one of an interrupt service routine model, a device driver model, and driver entry points.

9. In a data processing system comprising an operating system (OS) adapter component which is specific to a particular operating system, an OS-independent processor component, and an OS-independent peripheral component, a method comprising:
   generating OS-specific initialization code for a target processor by the OS-independent processor component, wherein during the generating the OS-specific initialization code, the OS-independent processor component queries the OS adapter for information specific to the particular operating system; and
   generating OS-specific driver code for the target processor by the OS-independent peripheral component, wherein during the generating the OS-specific driver code, the OS-independent peripheral component queries the OS adapter for information specific to the particular operating system, and wherein the OS-specific driver code is also specific to the target processor.

10. The method of claim 9, further comprising:
   requesting generation of the OS-specific driver code by the OS-independent processor component, wherein the generating the OS-specific driver code for the target processor by the OS-independent peripheral component is performed in response to the requesting the generation of the OS-specific driver code.

11. The method of claim 9, further comprising:
   compiling the generated OS-specific initialization code and the OS-specific driver code to create compiled code for the target processor.

12. The method of claim 11, further comprising:
   storing the compiled code on the target processor.

13. The method of claim 9, wherein the generating the OS-specific initialization code comprises:
   requesting, by the OS-independent processor component, an interrupt service routine model from the OS adapter component; and
   providing, from the OS adapter component to the OS-independent processor component, the interrupt service routine model, wherein the interrupt service routine model is specific to the particular operating system.

14. The method of claim 9, wherein the generating the OS-specific driver code comprises:
   requesting, by the OS-independent peripheral component, information from the OS adapter component; and providing, from the OS adapter component to the OS-independent peripheral component, the information, wherein the information is specific to the particular operating system.

15. The method of claim 14, wherein the information comprises memory management information.

16. The method of claim 14, wherein the information comprises a device table structure.

17. The method of claim 9, wherein the data processing system further comprises a second OS-independent peripheral component, and the method further comprises:

generating second OS-specific driver code for the target processor by the second OS-independent peripheral component, wherein during the generating the second OS-specific driver code, the second OS-independent peripheral component queries the OS adapter for information specific to the particular operating system, and wherein the second OS-specific driver code is also specific to the target processor.

18. A data processing system, comprising:

a central processing unit (CPU); and a memory coupled to the central processing unit, wherein the memory comprises;

an operating system (OS) adapter component specific to a particular operating system;

an OS-independent processor component, which, when executed by the CPU:

provides a request to the OS adapter component for an interrupt service routine type, wherein, in response thereto, the OS adapter component provides the interrupt service routine type specific to the particular operating system to the OS-independent processor component; and uses the received interrupt service routine type from the OS adapter component to generate initialization code for a target processor that is specific to the particular operating system; and an OS-independent peripheral component, which, when executed by the CPU:

provides one or more requests to the OS adapter component for information specific to the particular operating system, wherein, in response to each of the one or more requests, the OS adapter component provides the information to the OS-independent peripheral component; and uses the received information from the OS adapter component to generate driver code specific to the particular operating system and the target processor.

19. The data processing system of claim 18, wherein the received information from the OS adapter component comprises memory management information and a device table structure.

20. The data processing system of claim 18, wherein the initialization code and the driver code that are specific to the particular operating system include functions of the particular operating system.

* * * * *